(12) United States Patent
Harshman et al.

(10) Patent No.: US 6,289,631 B1
(45) Date of Patent: Sep. 18, 2001

(54) BOUQUET HOLDER APPARATUS WITH A PAIR OF HANDLES

(75) Inventors: Trent A. Harshman, Galveston, IN (US); Mary M. Schneider, Cincinnati, OH (US)

(73) Assignee: Syndicate Sales, Inc., Kokomo, IN (US)

(*) Notice: Subject to any disclaimer, the term of this patent is extended or adjusted under 35 U.S.C. 154(b) by 0 days.

(21) Appl. No.: 09/363,454

(22) Filed: Jul. 29, 1999

(51) Int. Cl.[7] .............................. A47G 7/00; A47G 7/02
(52) U.S. Cl. ........................................ 47/41.12; 47/41.01
(58) Field of Search .................. 47/41.01, 41.1, 47/41.11, 41.12, 41.13

(56) References Cited

U.S. PATENT DOCUMENTS

| | | |
|---|---|---|
| 65,204 | 5/1867 | Frye, Jr. . |
| D. 317,884 | 7/1991 | Spicer ................................ D11/147 |
| D. 386,715 * | 11/1997 | Graham et al. ..................... D11/143 |
| 1,225,767 | 5/1917 | Casteris . |
| 1,433,808 * | 10/1922 | Fox . |
| 1,448,919 | 3/1923 | Duffy . |
| 1,851,205 | 3/1932 | Nagai . |
| 2,486,109 | 10/1949 | Brutocao et al. ......................... 47/55 |
| 2,728,964 | 1/1956 | Baird ......................................... 24/5 |
| 2,765,585 | 10/1956 | Smithers .................................. 47/41 |
| 2,815,606 * | 12/1957 | Quackenbush . |
| 2,844,916 | 7/1958 | Rapp ........................................ 47/41 |
| 2,876,587 * | 3/1959 | Saks et al. . |
| 3,309,258 * | 3/1967 | Gallo . |
| 3,576,699 * | 4/1971 | Meyer . |
| 3,651,601 * | 3/1972 | La Montagne ....................... 47/41.12 |
| 3,949,568 | 4/1976 | Gallagher .............................. 63/1 A |
| 4,204,365 | 5/1980 | Hirvi ..................................... 47/41 R |
| 4,418,496 | 12/1983 | Koistinen ............................. 47/41.12 |
| 4,566,221 | 1/1986 | Kossin ................................. 47/41.12 |
| 4,628,632 * | 12/1986 | Zwier ....................................... 47/33 |
| 5,020,272 * | 6/1991 | Herrema et al. ......................... 47/33 |
| 5,070,644 | 12/1991 | Hasty .................................. 47/41.12 |
| 5,414,957 | 5/1995 | Kenney ............................... 47/41.12 |
| 5,454,189 * | 10/1995 | Graham et al. ...................... 47/41.12 |
| 5,735,075 * | 4/1998 | Honkawa et al. ................... 47/41.12 |
| 5,787,638 | 8/1998 | Harshman ........................... 47/41.12 |
| 5,934,016 * | 8/1999 | Jones .................................. 47/41.12 |
| 5,996,813 * | 12/1999 | Hendrix et al. ................. 47/41.12 X |

FOREIGN PATENT DOCUMENTS

3711149 A  *  10/1988  (DE) .

* cited by examiner

*Primary Examiner*—Peter M. Poon
*Assistant Examiner*—Jeffrey L. Gellner
(74) *Attorney, Agent, or Firm*—Woodard, Emhardt, Naughton, Moriarty & McNett (57) ABSTRACT

A bouquet holder apparatus comprises a head including a cup and a rim. The cup has a first aperture, a second aperture, and an upper edge defining an opening thereto. The rim is adjoined to the upper edge. The bouquet holder apparatus further comprises a block of foam partially disposed within the opening of the cup. The bouquet holder apparatus further comprises a first handle having a first gripping surface. The first handle is adjoined to the cup. The bouquet holder apparatus further comprises a second handle including a ring, and a shank. The ring has a inner diameter surface serving as a second gripping surface. A proximal end of the shank is adjoined to an upper portion of the ring. A middle portion of the shank is extended through the apertures of the cup and disposed within the portion of the block of foam disposed within the opening of the cup with a proximal end of the shank being adjacent the first aperture and a distal end of the shank being adjacent the second aperture. The second handle further includes one or more tabs, a rod, a barb, and one or more knobs. The tab(s) is(are) adjoined to the cup and/or the block of foam. A proximal end of the rod is adjoined to the distal end of the shank and the barb is adjoined to a distal end of the rod with the knob(s) is(are) adjoined to the rod.

17 Claims, 8 Drawing Sheets

BOUQUET HOLDER APPARATUS WITH A PAIR OF HANDLES

BACKGROUND OF THE INVENTION

1. Field of the Invention

The present invention generally relates to a bouquet holder apparatus. More particularly, the present invention relates to a bouquet holder apparatus for an improved balance and support of a floral arrangement.

2. Background

Bouquet holder apparatuses are well known in the art. Typically, the bouquet holder apparatus comprises a head having a floral arrangement mounted thereto. Such bouquet holder apparatuses further comprise an elongated handle downwardly extending from the head. Problems associated with some of the prior bouquet holder apparatuses include a tendency of the handle to bend due to the weight of the floral arrangement, and an inability of a user of the bouquet holder apparatus to stabilize the handle within the user's hand.

Consequently, subsequent bouquet holder apparatuses were directed to improving a user's ability to grip one or more surfaces of the handle. For example, U.S. Pat. No. 5,787,638 discloses a bouquet holder apparatus comprising a handle with a convex shaped gripping surface for a user's fingers and a thumb-engaging surface. This was a significant improvement over previous handles. However, in light of the need to offer a wide selection of diverse bouquet holder apparatuses to fulfill the varied styles and comforts demanded by customers, further developments in bouquet holder apparatuses was therefore needed.

SUMMARY OF THE INVENTION

The present invention provides a new and unique bouquet holder apparatus with a pair of handles. The bouquet holder apparatus overcomes the aforementioned drawbacks associated with prior bouquet holder apparatuses having a handle that is void of a sufficient resistance to being bent, and/or void of any sufficient gripping surface(s). Various aspect of the present inventions are novel, non-obvious, and provide various advantages. While the actual nature of the present invention described in detail herein can only be determined with reference to the claims appended hereto, certain features which are characteristic of the present invention disclosed herein can be described briefly.

As shown in the following description of the various embodiments of the present invention, a bouquet holder apparatus comprises a head, a first handle, and a second handle. The first handle is adjoined to the head, and the second handle can be adjoined to the head and/or the first handle. The first handle includes a gripping surface whereby one or more digits of a hand can be disposed thereon, and the second handle includes a gripping surface whereby the remaining digits of the hand is disposed thereon. The bouquet holder apparatus can further comprise a block of foam affixed to the head. A plurality of flowers stems can be selectively inserted into the block of foam to thereby define a floral arrangement.

It is a primary objective of the present invention to provide a bouquet holder apparatus with a pair of handles to jointly counterbalance a gravitational force exerted by a floral arrangement mounted to a head of the bouquet holder apparatus.

It is another primary objective of the present invention to provide a bouquet holder apparatus with a pair of handles to jointly counterbalance any linear force, any rotational force, and/or any pivotal force applied to a head of the bouquet holder apparatus.

Secondary objectives as well as advantages of the present invention such as, comfort, security, and balance will be apparent from the following description of the present invention and various embodiments thereof.

DESCRIPTION OF THE PREFERRED EMBODIMENT

For the purposes of promoting an understanding of the principles of the present invention, reference will now be made to the preferred and alternative embodiments of the present invention as illustrated in the drawings and specific language will be used to describe the same. It will nevertheless be understood that no limitation of the scope of the present invention is thereby intended. Any alterations and further modifications in the illustrated embodiments, and any further applications of the principles of the present invention as illustrated herein are contemplated as would normally occur to one skilled in the art to which the present invention relates.

Figure 1:
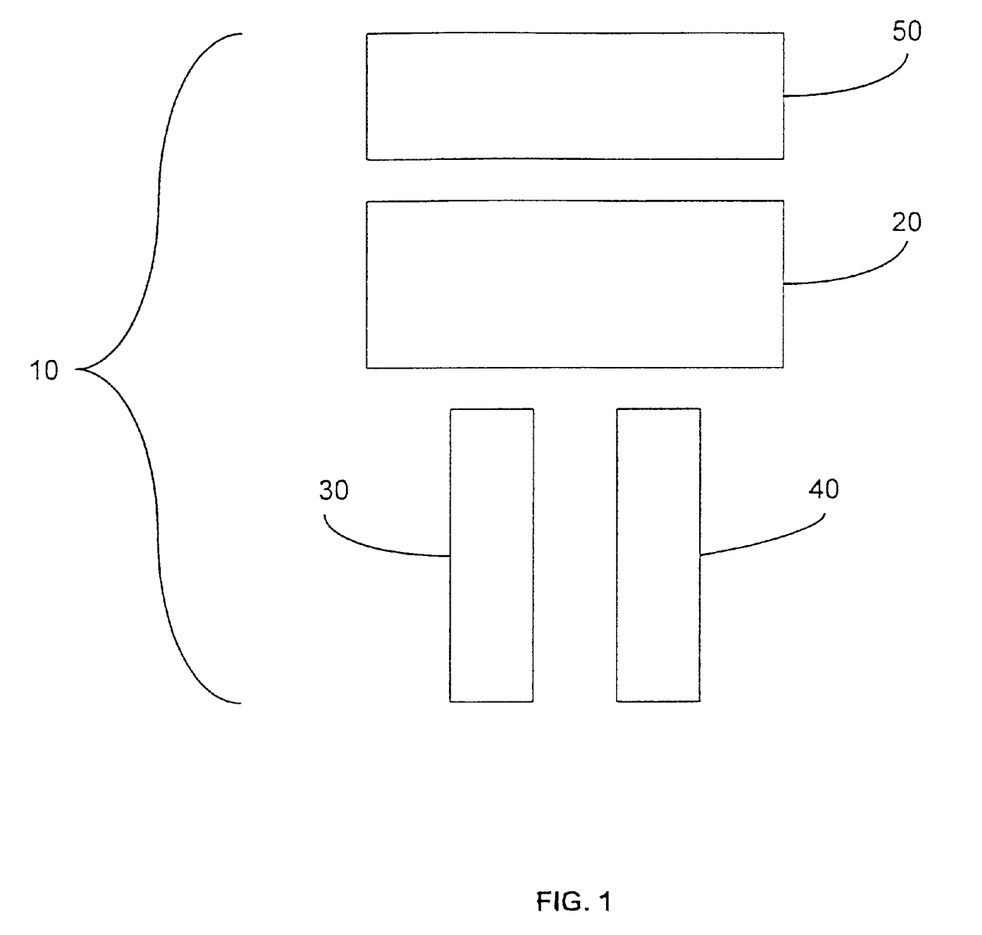
FIG. 1 is an exploded view of a block diagram of a bouquet holder apparatus of the present invention.

The present invention is a bouquet holder apparatus 10 as shown in FIG. 1. For purposes of the present invention, the term adjoined is defined as a unitary fabrication, an affixation, or a detachable coupling by any method of two or more components of an embodiment of bouquet holder apparatus 10. Referring to FIG. 1, each embodiment of bouquet holder apparatus 10 comprises a head 20. The present invention contemplates that head 20 can have any geometric configuration and any dimensions, and that head 20 can be made from any suitable material. Consequently, any illustration of a preferred embodiment of head 20 herein as well as an accompanying description is given solely for purposes of describing the best mode of the present invention and is not to be limiting in any way.

Each embodiment of bouquet holder apparatus 10 further comprises a handle 30 having a gripping surface whereby one or more digits of a user's head can be disposed upon.

The present invention contemplates that handle 30 can have any geometric configuration and any dimensions, and that handle 30 can be made from any suitable material. The present invention further contemplates that handle 30 may or may not be adjoined to head 20, and that any portion of handle 30 can be adjoined to any portion of head 20 for embodiments of bouquet holder apparatus 10 having handle 30 adjoined to head 20. Consequently, any illustration of a preferred embodiment of handle 30 herein as well as an accompanying description is given solely for purposes of describing the best mode of the present invention and is not to be limiting in any way.

Each embodiment of bouquet holder apparatus 10 further comprises a handle 40 having a gripping surface whereby the remaining digits of a user's head can be disposed upon. The present invention contemplates that handle 40 can have any geometric configuration and any dimensions, and that handle 40 can be made from any suitable material. For embodiments of bouquet holder apparatus 10 having handle 30 adjoined to head 20, the present invention contemplates that handle 40 can either be adjoined to head 20, and/or handle 30. For embodiments of bouquet holder apparatus 10 not having handle 30 adjoined to head 20, the present invention contemplates that handle 40 is separately adjoined to head 20 and to handle 30. For embodiments of bouquet holder apparatus 10 having handle 40 adjoined to head 20, the present invention contemplates that any portion of handle 40 can be adjoined to any portion of head 20. For embodiments of bouquet holder apparatus 10 having handle 40 adjoined to handle 30, the present invention contemplates that any portion of handle 40 can be adjoined to any portion of handle 30. Consequently, any illustration of a preferred embodiment of handle 40 herein as well as an accompanying description is given solely for purposes of describing the best mode of the present invention and is not to be limiting in any way.

An embodiment of bouquet holder apparatus 10 optionally comprises a block of foam 50 to be affixed to head 20 by any method whereby a plurality of flower steams may be selectively inserted into foam 50 to thereby define a desired floral arrangement that is mounted upon head 20. The present invention contemplates that foam 50 can have any geometric configuration and any dimensions, and that foam 50 is made from suitable material. Consequently, any illustration of a preferred embodiment of foam 50 herein as well as an accompanying description is given solely for purposes of describing the best mode of the present invention and is not to be limiting in any way. For embodiments of bouquet holder apparatus 10 comprising foam 50 and having handle 30 adjoined to head 20, the present invention contemplates that handle 40 can be either adjoined to head 20, handle 30, and/or foam 50.

Figure 2:
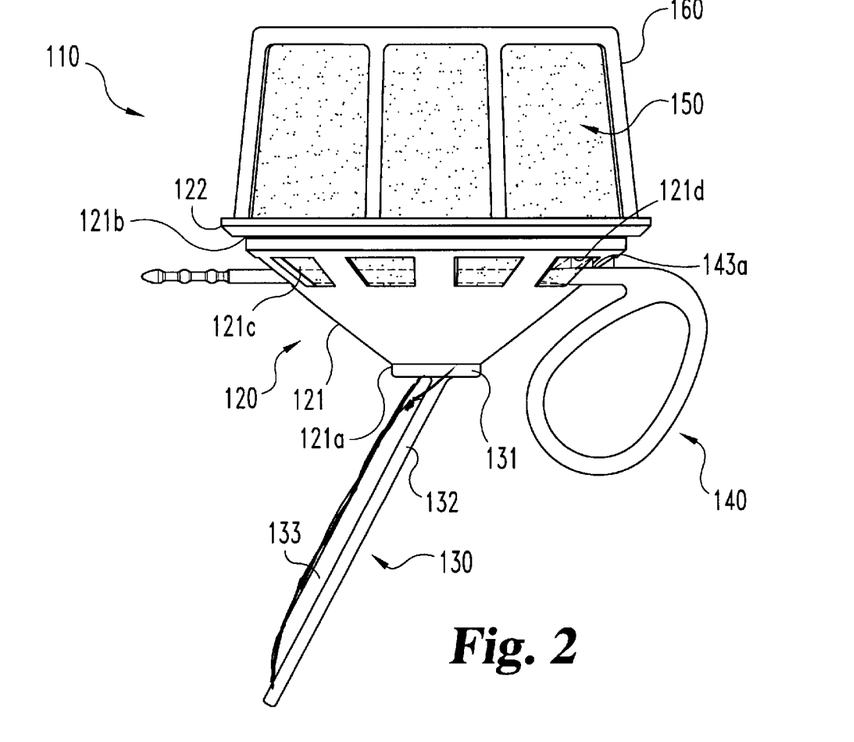
FIG. 2 is side view of a preferred embodiment of a bouquet holder apparatus in accordance with the present invention.

Referring to FIG. 2, a bouquet holder apparatus 110 as a preferred embodiment of bouquet holder apparatus 10 (FIG. 1) is shown. Bouquet holder apparatus 110 comprises a head 120 as a preferred embodiment of head 20 (FIG. 1). Head 120 includes a cup 121, and a rim 122. Cup 121 has a conically shaped configuration upwardly extending from a lower edge 121a to an upper edge 121b. Cup 121 is made from a plastic, and lower edge 121a is dimensioned to be inserted between a forefinger and a thumb of a user of bouquet holder apparatus 110. Cup 121 optionally includes a plurality of apertures 121c serially disposed adjacent upper edge 121b. Rim 122 has an annular configuration, and is adjoined to (preferably unitarily fabricated with) upper edge 121b of cup 121.

Bouquet holder apparatus 110 further comprises a handle 130 as a preferred embodiment of handle 30 (FIG. 1). Handle 130 includes a circlet 131, a flange 132 having a rectangular configuration with rounded corners, and a body 133 having a semi-circular configuration. A topside surface of circlet 131 is adjoined to (preferably unitarily fabricated with) bottomside surface of cup 121 adjacent lower edge 121a. A proximal end of flange 132 is adjoined to (preferably unitarily fabricated with) to a bottomside surface of circlet 131 at an angle, and a distal end of flange 132 is downwardly and outwardly extended from circlet 131. Body 133 is adjoined to (preferably unitarily fabricated with) flange 132 with a distal end of body 133 being adjacent the distal end of flange 132, a proximal end of body 133 being adjacent the proximal end of flange 132, and a convex surface of body 133 extending upwardly from flange 132. Flange 132 and body 133 are dimensioned whereby a user of bouquet holder apparatus 110 can comfortably dispose two or more digits of his or her hand along the convex surface of body 133 and/or flange 132, or comfortably abut his or her palm against the convex surface of body 133 and/or flange 132.

Figure 3:
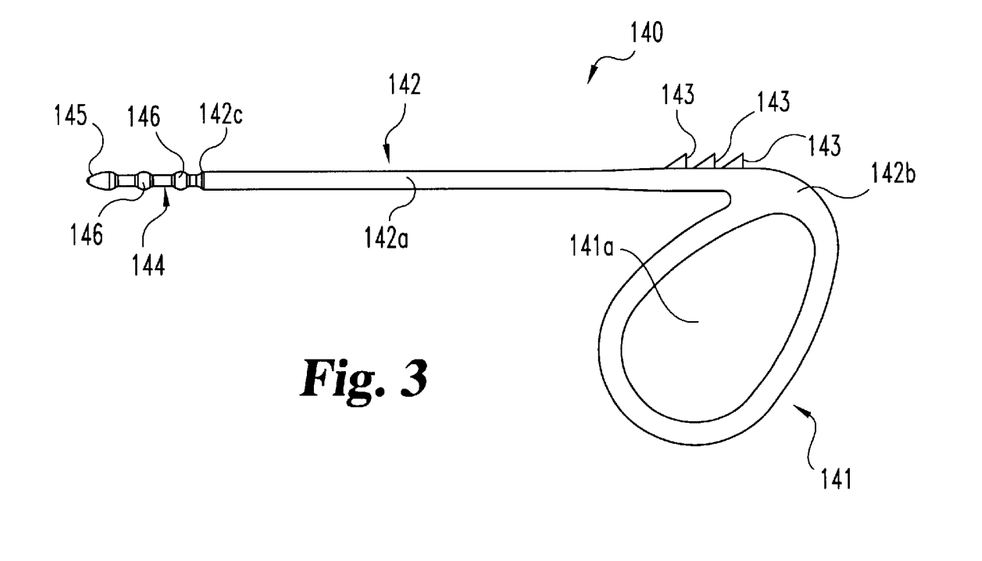
FIG. 3 is a side view of a preferred embodiment of an upper handle of the bouquet holder apparatus in FIG. 2.

Referring to FIGS. 2 and 3, bouquet holder apparatus 110 further comprises a handle 140 as a preferred embodiment of handle 40 (FIG. 1). Handle 140 includes a ring 141 having an oval configuration, and a shank 142 having a cylindrical configuration. A hole 141a of ring 141 is dimensioned whereby a user of bouquet holder apparatus 110 can comfortably insert one or more digits of his or her hand through hole 141a and abut the digit(s) against an inner diameter surface (not shown) of ring 141. Ring 141 is made from a plastic or suitable material, and a proximal end 142b of shank 142 is adjoined to (preferably unitarily fabricated with) an upper portion of ring 141 with a lower portion of ring 141 being tilted toward shaft 142. A middle portion 142a of shank 142 is dimensioned to be inserted through opposing apertures 121c of cup 121 with proximal end 142b and a distal end 142c of shank 142 extended away from the opposing apertures 121c as best shown in FIG. 2. Alternatively, shank 142 may be severed between the two apertures so that the shank extends only through a single aperture.

Handle 140 optionally includes one or more locking tabs for locking the handle to cup 121. Tabs 143 have a right triangular configuration, e.g. three (3) tabs 143 as shown. Tabs 143 are serially disposed along a topside surface of middle portion 142a of shank 142 adjacent proximal end 142b of shank 142 with a bottomside surface (not shown) of each tab 143 adjoined to (preferably unitarily fabricated with) the topside surface of shank 142, a vertical side surface (not shown) extending upwardly from the topside surface of shank 142, and an inclined side surface (not shown) extending upwardly at an angle from the topside surface of shank 142 to the vertical side surface.

Handle 140 optionally includes a rod 144 having a cylindrical configuration, a barb 145, and one or more knobs 146 having annular configurations, e.g. two (2) knobs 146 as shown. A proximal end of rod 144 is adjoined to (preferably unitarily fabricated with) distal end 142c of shank 142, and barb 145 is adjoined to (preferably unitarily fabricated with) a distal end of rod 144. The present invention contemplates that barb 145 can be adjoined to (preferably unitarily fabricated with) the distal end of shank 142 for alternative embodiments of handle 140 omitting rod 144. Knobs 146 are serially disposed around rod 144.

Referring again to FIG. 2, bouquet holder apparatus 110 optionally comprises a water retaining or dry foam 150 having a cylindrical configuration as a preferred embodiment of foam 50 (FIG. 1), and a cage 160 having a cylindrical configuration. Foam 150 is disposed within a bottom opening (not shown) of cage 160, and a lower edge (not shown) of cage 160 is adjoined to (preferably affixed to) rim 122. Foam 150 is dimensioned to extend through the bottom opening of cage 160 into cup 121 below apertures 121*c*. Barb 145 is utilized to bore handle 140 through foam 150 with middle portion 142*a* of shank 142 extending through a pair of apertures 121*c* and disposed within foam 150. One or more tabs 143 engage foam 150, e.g. one tab 143 as shown, to thereby couple handle 140 to foam 150. Tabs 143 lockingly engage the lower portion of upper rim 121*b* adjacent aperture 121*c*. For example, tab 143*a* (FIG. 2) engages lower portion 121*d* of upper rim 121*b*. A modified embodiment of bouquet holder apparatus 110 has foam 150 dimensioned to extend into cup 121 and be above apertures 121*c*. With foam 150 dimensioned as such, middle portion 142*a* of shank 142 is disposed within cup 120 with multiple tabs 143 having an upper edge to contact portion 121*d* of upper rim 121*b* therebetween to thereby couple handle 140 to cup 120.

Still referring to FIG. 2, it is to be appreciated that a plurality of flower steams can be selectively inserted through foam 150 to thereby define a floral arrangement mounted on head 20. Flower steams having a length greater than the height of foam 150 can also be extended through an aperture 121*c*. It is to be further appreciated that a user of bouquet holder apparatus 10 can use mounting knobs 146 to secure the floral arrangement by tying wire or other means thereto. A further use of knobs 146 is to allow for a means of securing decorations to the apparatus.

Figure 4:
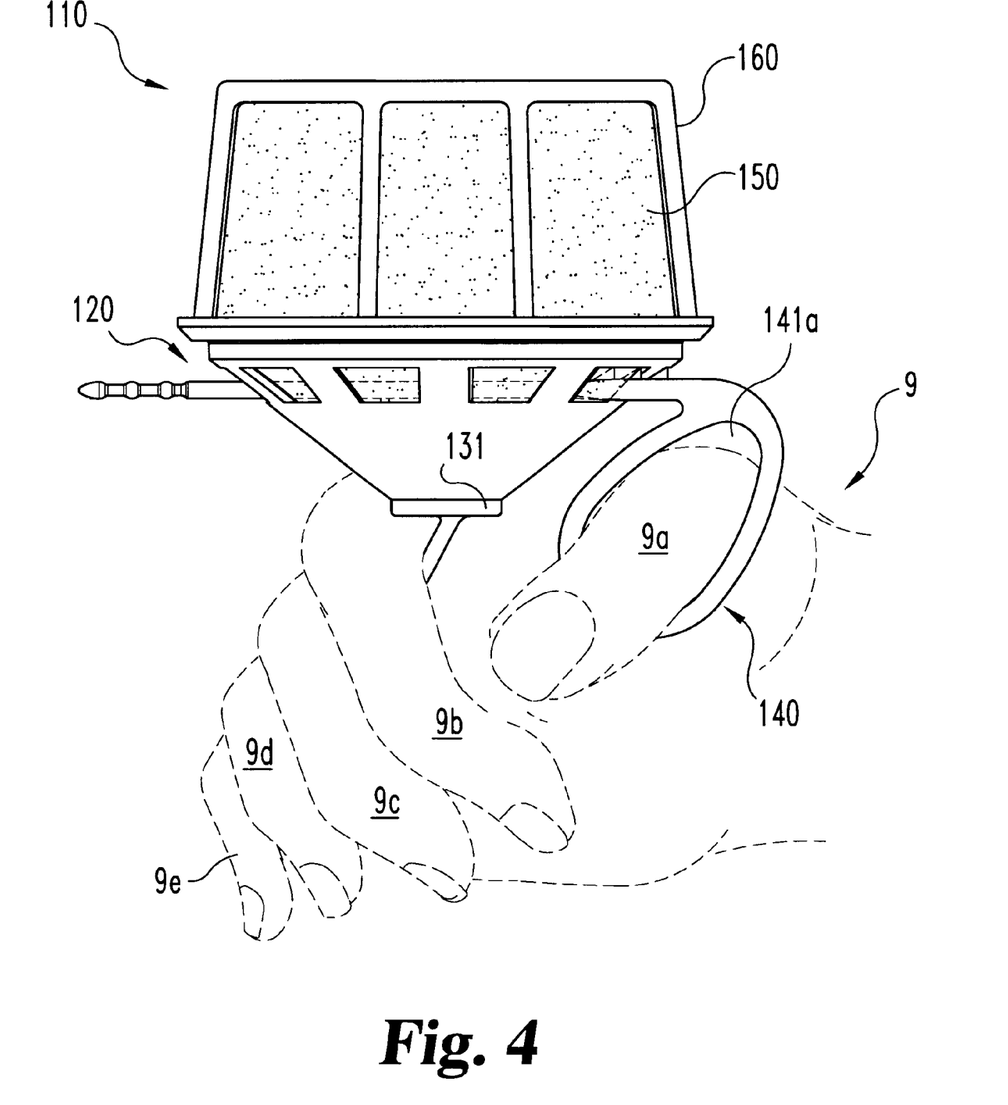
FIG. 4 is a side view of the bouquet holder apparatus of FIG. 2 with a thumb of a user being extended through the upper handle of the bouquet holder apparatus of FIG. 2.

Referring to FIG. 4, a first example of a user holding bouquet holder apparatus 110 is shown. A hand 9 of the user includes a thumb 9*a* extended through hole 141*a* of ring 141 and abutting against the inner diameter surface of ring 141. Hand 9 further includes an index finger 9*b*, a middle finger 9*c*, a ring finger 9*d*, and a pinky finger 9*e* disposed around the convex surface of body 133 as well as flange 132. It is to be appreciated that a gravitational force applied to both handle 130 and handle 140 by a plurality of flowers (not shown) having stems inserted into foam 150 is jointly counterbalanced by handle 130 and handle 140. It is to further appreciated that any linear force, any rotational force, and/or any pivotal force applied to bouquet holder apparatus 110, e.g. a forward tilt of bouquet holder apparatus 110, is jointly counterbalanced by handle 130 and handle 140.

Figure 5:
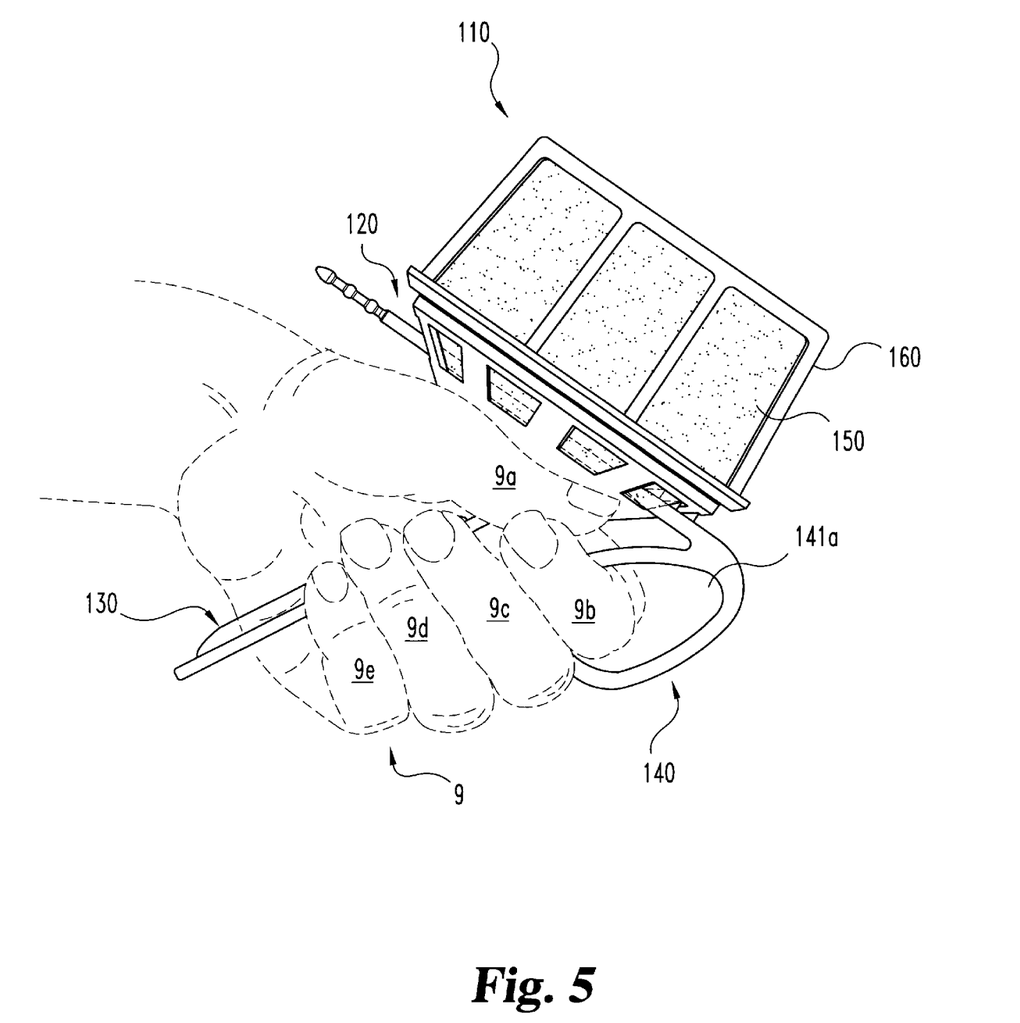
FIG. 5 is a side view of the bouquet holder apparatus of FIG. 2 with a forefinger of a user being extended through the upper handle of the bouquet holder apparatus of FIG. 2.

Referring to FIG. 5, a second example of a user holding bouquet holder apparatus 110 is shown. Hand 9 of the user includes index finger 9*b* extended through hole 141*a* of ring 141 and abutting against the inner diameter surface of ring 141. Hand 9 further includes thumb 9*a*, middle finger 9*c*, ring finger 9*d*, and pinky finger 9*e* disposed around flange 132 with a palm of hand 9 abutting the convex surface of body 133. Again, it is to be appreciated that a gravitational force applied to both handle 130 and handle 140 by a plurality of flowers (not shown) having stems inserted into foam 150 is jointly counterbalanced by handle 130 and handle 140. It is to again be appreciated that any linear force, any rotational force about handle 130, and/or any pivotal force applied to bouquet holder apparatus 110, e.g. a sideward tilt of bouquet holder apparatus 110, is jointly counterbalanced by use of handle 130 and handle 140 at the same time.

Figure 6:
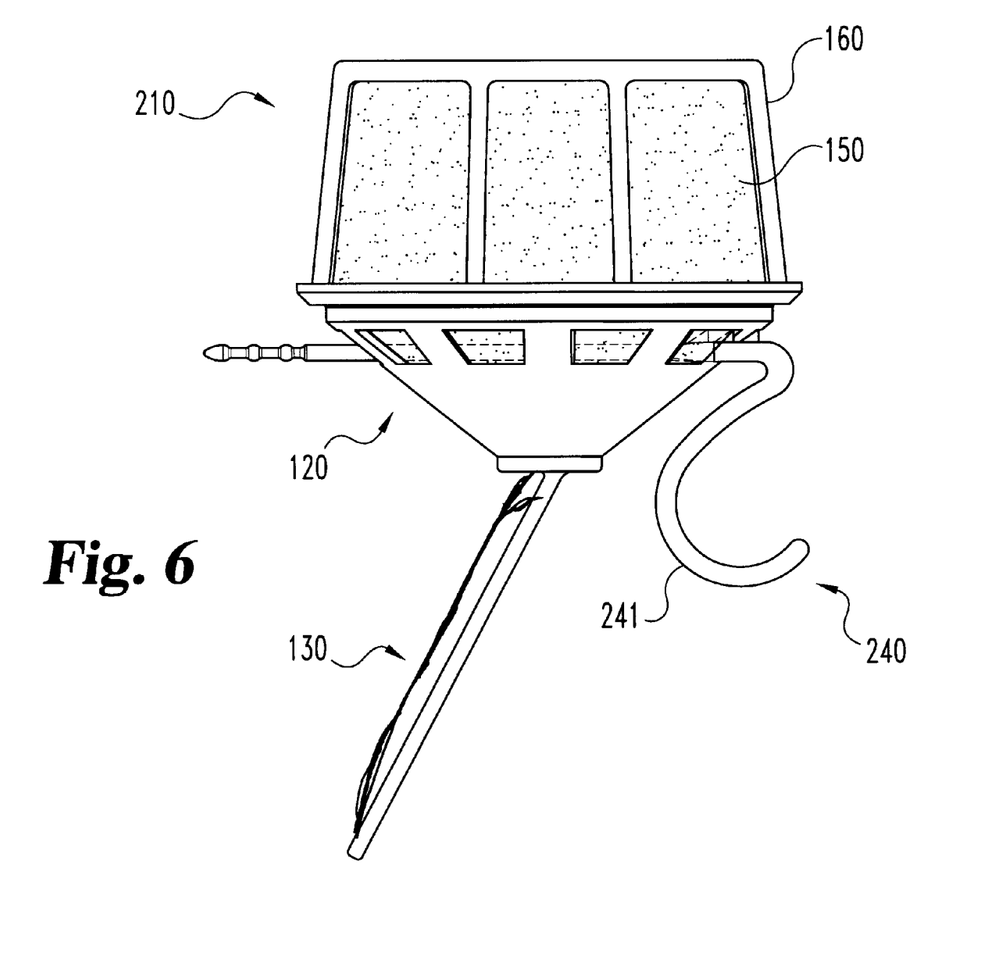
FIG. 6 is a side view of one alternative embodiment of a bouquet holder apparatus in accordance with the present invention.

Referring to FIG. 6, a bouquet holder apparatus 210 as an alternative embodiment of bouquet holder apparatus 10 (FIG. 1) is shown. Bouquet holder apparatus 210 comprises head 120 and handle 130 as previously described herein in connection with FIG. 2, and optionally comprises foam 150 and cage 160 as previously described herein in connection with FIG. 2. Bouquet holder apparatus 210 further comprises a handle 240 as another embodiment of handle 40 (FIG. 1). Handle 240 includes shank 142 as previously described herein in connection with FIG. 3, and optionally includes tabs 143, rod 144, barb 145, and knobs 146 as previously described herein in connection with FIG. 3. Handle 240 further includes an arcuate member 241 having one end adjoined to (preferably unitarily fabricated with) proximal end 142*b* of shank 142 with an opposing end extending upwardly and outwardly. It is to be appreciated that a user of bouquet holder apparatus 210 abuts one or more digits of his or her hand, e.g. a thumb or a forefinger, against an inner diameter surface (not shown) of arcuate member 241.

Figure 7:
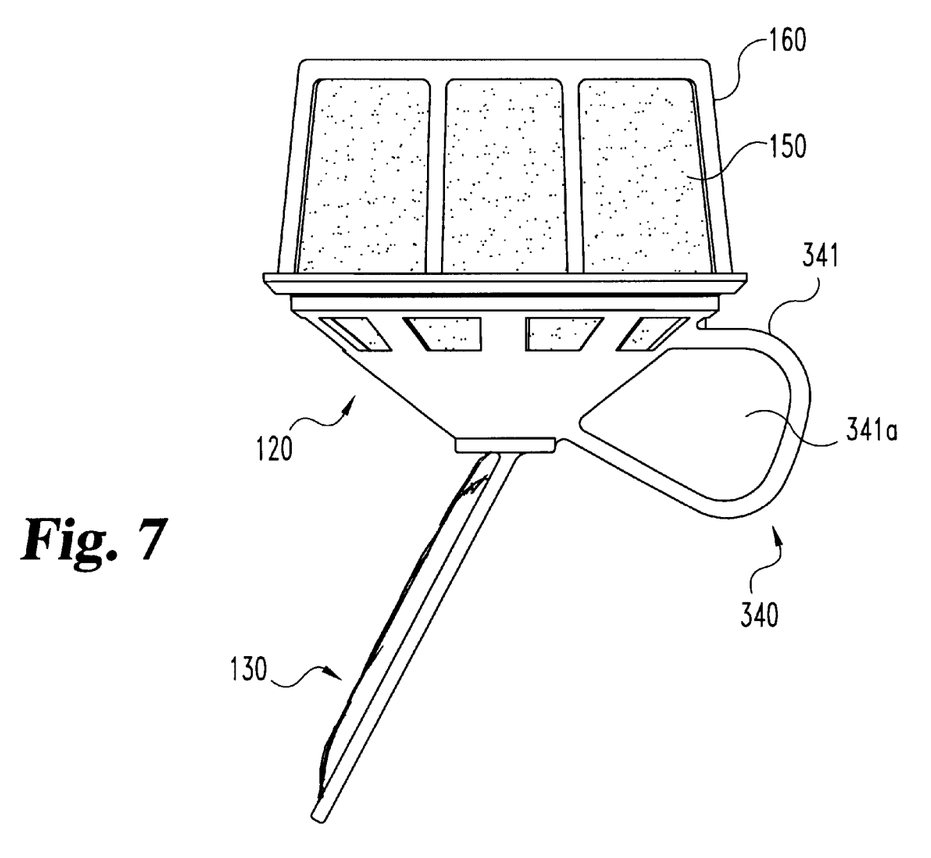
FIG. 7 is a side view of another alternative embodiment of a bouquet holder apparatus in accordance with the present invention.

Referring to FIG. 7, a bouquet holder apparatus 310 as an alternative embodiment of bouquet holder apparatus 10 (FIG. 1) is shown. Bouquet holder apparatus 310 comprises head 120 and handle 130 as previously described herein in connection with FIG. 2, and optionally comprises foam 150 and cage 160 as previously described herein in connection with FIG. 2. Bouquet holder apparatus 310 further comprises a handle 340 including an arcuate member 341 as an alternative embodiment of handle 40 (FIG. 1). Arcuate member 341 has a top end adjoined to (preferably unitarily fabricated with) cup 121 adjacent apertures 121*c*, and a bottom end adjoined to (preferably unitarily fabricated with) cup 121 adjacent lower edge 121*b* to thereby define a hole 341*a*. It is to be appreciated that a user of bouquet holder apparatus 310 extend one or more digits of his or her hand through hole 341*a* and abuts the digit(s) against cup 121 and/or an inner diameter surface (not shown) of arcuate member 341.

Figure 9:
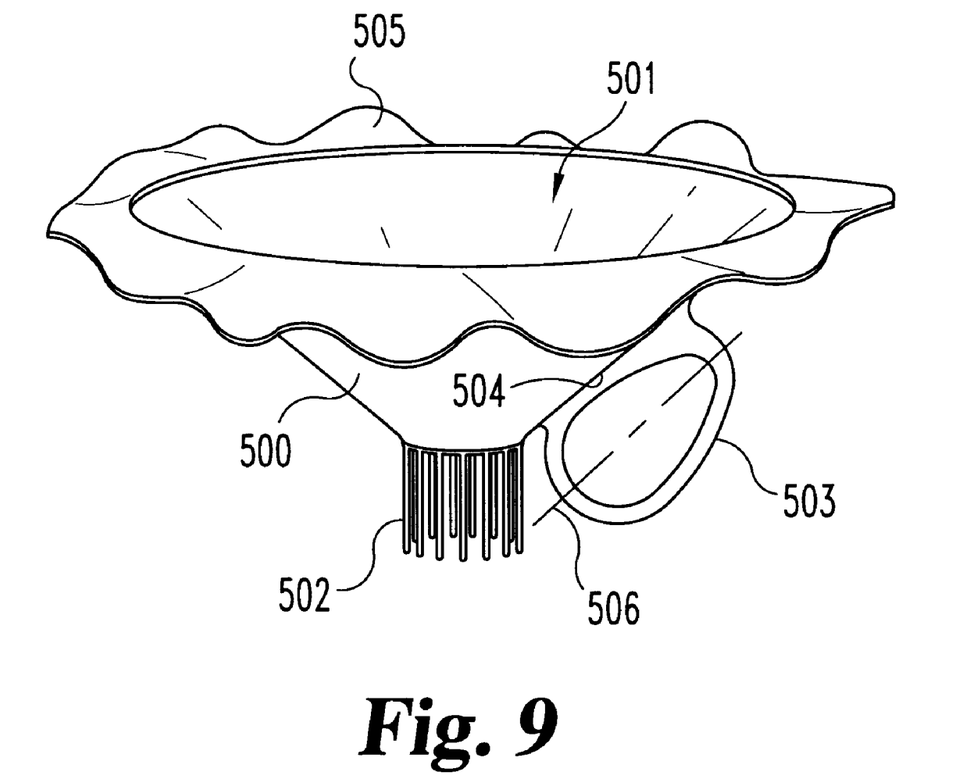
FIG. 9 is a side perspective view of a collar mountable to the holder apparatus of FIG. 2.

Referring to FIG. 9, a collar 500 has a conical configuration. The top end 501 of the collar is sized to slip onto the outwardly facing surface of cup 121. A decorative fabric 505 is secured to the top edge surrounding end 501. The bottom end 502 of collar 500 includes a plurality of downwardly extending fingers surrounding handle 130. Tape or other means secure the fingers to handle 130. Ring 503 has a ring major axis 506 extending in the direction of the length of the collar main body. Ring 503 includes an inner portion 504 fixedly mounted to the outer surface of collar 500. Ring 503 therefore is used in lieu of ring 141 and in cooperation with handle 130. Collar 500 without ring 503 is known in the prior art.

Figure 8:
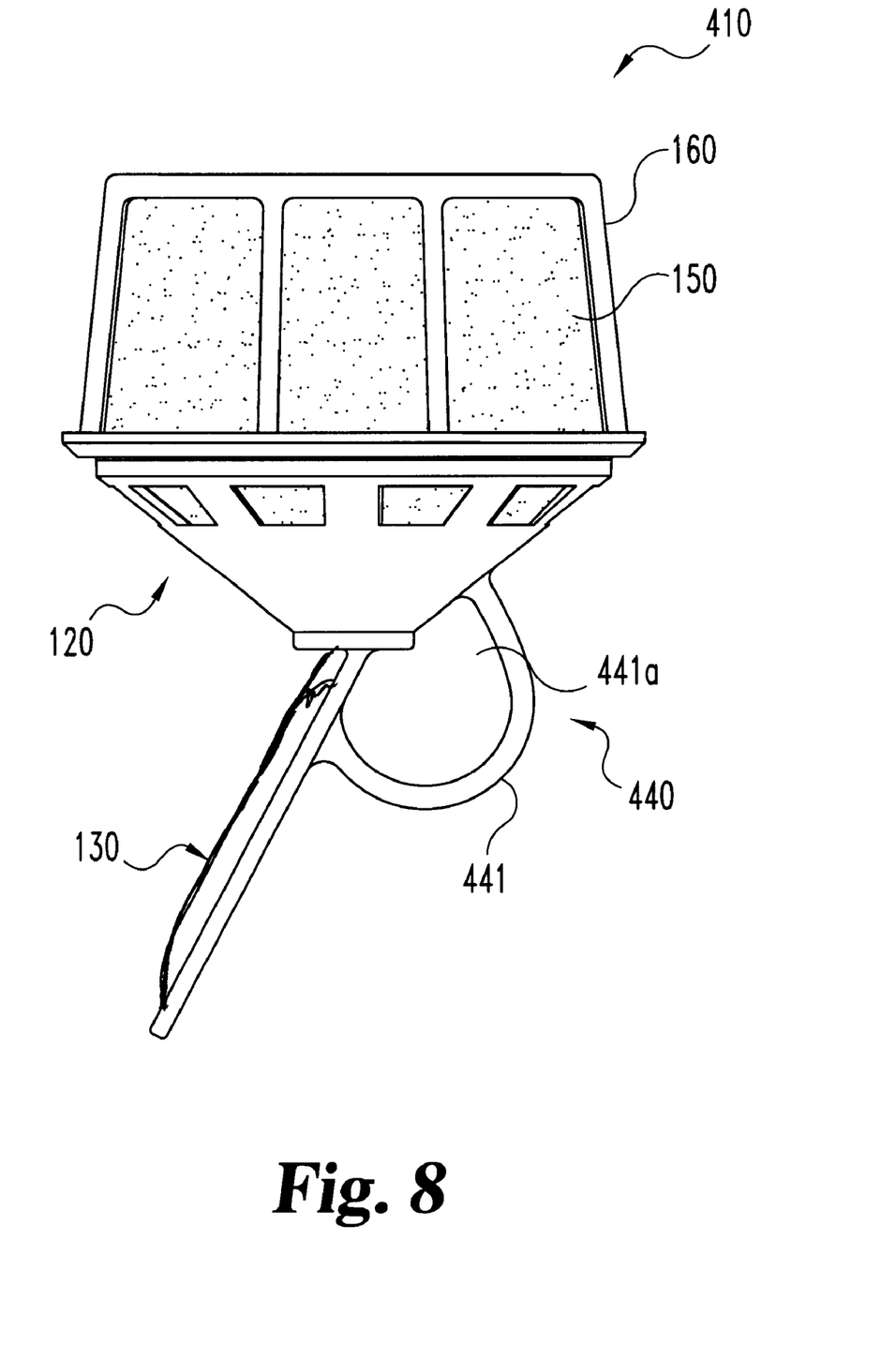
FIG. 8 is a side view of another alternative embodiment of a bouquet holder apparatus in accordance with the present invention.

Referring to FIG. 8, a bouquet holder apparatus 410 as an alternative embodiment of bouquet holder apparatus 10 (FIG. 1) is shown. Bouquet holder apparatus 410 comprises head 120 and handle 130 as previously described herein in connection with FIG. 2, and optionally comprises foam 150 and cage 160 as previously described herein in connection with FIG. 2. Bouquet holder apparatus 410 further comprises a handle 440 including an arcuate member 441 as an alternative embodiment of handle 40 (FIG. 1). Arcuate member 441 has a top end adjoined to (preferably unitarily fabricated with) cup 121 adjacent apertures 121*c*, and a bottom end adjoined to (preferably unitarily fabricated with) handle 130 adjacent flange 132 to thereby define a hole 441*a*. It is to be appreciated that a user of bouquet holder apparatus 410 extend one or more digits of his or her hand through hole 441 a and abuts the digit(s) against cup 121, circlet 131, flange 132, and/or an inner diameter surface (not shown) of arcuate member 441.

Still referring to FIG. 8, another alternative embodiment (not shown) of bouquet holder apparatus 10 (FIG. 1) is a modified version of bouquet holder apparatus 410. This alternative embodiment further comprises a collar (not shown) having a conical configuration, and dimensioned to be slipped over and upon cup 121. The top end of arcuate member 341 is affixed to or detachably coupled to the collar adjacent apertures 121c, and the bottom end of arcuate member 341 is affixed to or detachably coupled to handle 130 adjacent flange 132 to thereby mount arcuate member 441 unto cup 121 and to thereby define hole 441a.

The purpose of the invention is to provide comfort, security, and balance to the person(s) handling the bouquet by counterbalancing the arrangement and not allowing for rotation or side to side movement. This is accomplished by the addition of the handle design shown in FIG. 3 inserted in the bouquet holder as shown in FIG. 2, or by modifying the current design of bouquet holders, as shown in FIGS. 7 and 8. In lieu of mounting the ring as shown in FIGS. 2–8, the ring may be mounted to the collar of FIG. 9. The collar of FIG. 9 is typically used in the final presentation of the bouquet.

While the present invention has been illustrated and described in detail in the drawings and foregoing description, the same is to be considered as illustrative and not restrictive in character, it being understood that the preferred embodiments have been shown and described and that all changes and modifications that come within the spirit of the invention are desired to be protected.

What is claimed is:

1. A bouquet holder apparatus comprising:
   a head;
   a first handle having a first gripping surface, said first handle mounted to said head;
   a second handle having a second gripping surface, said second handle mounted to said head,
   wherein said head includes a cup having a first aperture, and
   wherein said second handle includes
      a shank having a middle portion and a proximal end, said middle portion extended through said first aperture, said proximal end extending from said middle portion adjacent said first aperture, and
      an arcuate member adjoined to said proximal end of said shank, said an arcuate member opening outwardly and having an inner diameter surface to thereby serve as said second gripping surface of said second handle.

2. The bouquet holder apparatus of claim 1 wherein said second handle further includes at least one tab adjoined to said middle portion of said shank and adjoined to said first aperture to thereby adjoin said second handle to said head.

3. The bouquet holder apparatus of claim 2 wherein
   said cup further has a second aperture,
   said middle portion of said shank extends through said second aperture, and
   said shank further has a distal end extending from said middle portion of said shank adjacent said second aperture.

4. The bouquet holder apparatus of claim 3 wherein said second handle further includes
   a rod having a proximal end and a distal end, said proximal end of said rod adjoined to a distal end of said shank, and
   a barb adjoined to said distal end of said rod.

5. A bouquet holder apparatus comprising:
   a head including a cup, said cup having a first aperture and an upper edge defining an opening thereto;
   a first handle having a first gripping surface, said first handle adjoined to said head;
   a block of foam, at least a portion of said block of foam being disposed within said cup through said opening and extending below said first aperture; and
   a second handle having a second gripping surface, said second handle extending through said first aperture and adjoined to said at least a portion of said block of foam, and
   said second handle includes
      a shank having a middle portion and a proximal end, said middle portion extended through said first aperture and disposed within said at least a portion of said block of foam to thereby adjoin said second handle to said at least a portion of said block of foam, said proximal end extending from said middle portion adjacent said first aperture, and
      a ring adjoined to said proximal end of said shank, said ring having an inner diameter surface to thereby serve as said second gripping surface of said second handle.

6. The bouquet holder apparatus of claim 5 wherein said second handle further includes at least one tab adjoined to said middle portion of said shank and engaging said cup at said first aperture.

7. The bouquet holder apparatus of claim 5 wherein
   said cup further has a second aperture,
   said at least a portion of said block of foam extends below said second aperture,
   said middle portion of said shank extends through said second aperture,
   said shank further has a distal end extending from said middle portion of said shank adjacent said second aperture, and
   said second handle further includes
      a rod having a proximal end and a distal end, said proximal end of said rod adjoined to said distal end of said shank, and
      a barb adjoined to said distal end of said rod.

8. The bouquet holder apparatus of claim 7 wherein said second handle further includes at least one mounting knob adjoined to said rod.

9. A bouquet holder apparatus comprising:
   a head including a cup, said cup having a first aperture and an upper edge defining an opening thereto;
   a first handle having a first gripping surface, said first handle adjoined to said head;
   a block of foam, at least a portion of said block of foam being disposed within said cup through said opening and extending below said first aperture; and
   a second handle having a second gripping surface, said second handle extending through said first aperture and adjoined to said at least a portion of said block of foam, and wherein said second handle includes
      a shank having a middle portion and a proximal end, said middle portion extended through said first aperture and disposed within said at least a portion of said block of foam to thereby adjoin said second handle to said at least a portion of said block of foam, said proximal end extending from said middle portion adjacent said first aperture, and
      an arcuate member adjoined to said proximal end of said shank, said arcuate member having a first end adjoined to said proximal end and a second end spaced apart from said head and said first end forming an outwardly opening recess located between said first end and said second end and an inner surface therebetween to thereby serve as said second gripping surface of said second handle.

10. A bouquet holder apparatus comprising:

a head including a cup, said cup having a first aperture and an upper edge defining an opening thereto;

a first handle having a first gripping surface, said first handle adjoined to said head;

a block of foam, at least a portion of said block of foam being disposed within said cup through said opening and extending below said first aperture; and a second handle having a second gripping surface, said second handle extending through said first aperture and adjoined to said at least a portion of said block of foam, and wherein said second handle includes a shank having a middle portion and a proximal end, said middle portion extended through said first aperture and disposed within said at least a portion of said block of foam to thereby adjoin said second handle to said at least a portion of said block of foam, said proximal end extending from said middle portion adjacent said first aperture, and an arcuate member adjoined to said proximal end of said shank, said arcuate member having an inner diameter surface to thereby serve as said second gripping surface of said second handle, said cup further has a second aperture, said at least a portion of said block of foam extends below said second aperture, said middle portion of said shank extends through said second aperture, said shank further has a distal end extending from said middle portion of said shank adjacent said second aperture, said shank is straight between said distal end and said proximal end with said arcuate member opening outwardly, and said second handle further includes a rod having a proximal end and a distal end, said proximal end of said rod adjoined to said distal end of said shank, and a barb adjoined to said distal end of said rod.

11. A bouquet holder apparatus comprising:

a head including a cup, said cup having a first aperture and an upper edge defining an opening thereto;

a first handle having a first gripping surface, said first handle adjoined to said head;

a block of foam, at least a portion of said block of foam being disposed within said cup through said opening and extending below said first aperture; and a second handle having a second gripping surface, said second handle extending through said first aperture and adjoined to said at least a portion of said block of foam, wherein said second handle includes a shank having a middle portion and a proximal end, said middle portion extended through said first aperture and disposed within said at least a portion of said block of foam to thereby adjoin said second handle to said at least a portion of said block of foam, said proximal end extending from said middle portion adjacent said first aperture, and an arcuate member adjoined to said proximal end of said shank, said arcuate member having an inner diameter surface to thereby serve as said second gripping surface of said second handle, said second handle further includes a rod and at least one knob adjoined to said rod.

12. A bouquet holder apparatus comprising:

a head;

a first handle having a first gripping surface, said first handle mounted to said head;

a second handle having a second gripping surface, said second handle mounted to said head, wherein said head includes a cup having a first aperture, and wherein said second handle includes a shank having a middle portion and a proximal end, said middle portion extended through said first aperture, said proximal end extending from said middle portion adjacent said first aperture, and a ring adjoined to said proximal end of said shank, said ring having an inner diameter surface to thereby serve as said second gripping surface of said second handle.

13. The bouquet holder apparatus of claim 12 wherein said second handle further includes at least one tab adjoined to said middle portion of said shank and adjoined to said first aperture to thereby adjoin said second handle to said head.

14. The bouquet holder apparatus of claim 12 wherein said cup further has a second aperture, said middle portion of said shank extends through said second aperture, and said shank further has a distal end extending from said middle portion of said shank adjacent said second aperture.

15. The bouquet holder of claim 14 wherein said second handle further includes a rod having a proximal end and a distal end, said proximal end of said rod adjoined to a distal end of said shank, and a barb adjoined to said distal end of said rod.

16. A bouquet holder apparatus comprising:

a head;

a first handle having a first gripping surface, said first handle mounted to said head;

a second handle having a second gripping surface, said second handle mounted to said head, wherein said head includes a cup having a first aperture, and wherein said second handle includes a shank having a middle portion and a proximal end, said middle portion extended through said first aperture, said proximal end extending from said middle portion adjacent said first aperture, and a ring adjoined to said proximal end of said shank, said ring having an inner diameter surface to thereby serve as said second gripping surface of said second handle, said cup further has a second aperture, said middle portion of said shank extends through said second aperture, and said shank further has a distal end extending from said middle portion of said shank adjacent said second aperture, a rod having a proximal end and a distal end, said proximal end of said rod adjoined to a distal end of said shank, and a barb adjoined to said distal end of said rod, wherein said second handle further includes at least one knob adjoined to said rod.

17. A bouquet holder apparatus comprising:

a head;

a first handle having a first gripping surface, said first handle mounted to said head;

a second handle having a second gripping surface, said second handle mounted to said head wherein said second handle includes a shank having a middle portion and a proximal end, said middle portion extended through said first aperture, said proximal end extending from said middle portion adjacent said first aperture, and an arcuate member adjoined to said proximal end of said shank, said an arcuate member having an inner diameter surface to thereby serve as said second gripping surface of said second handle, wherein said second handle further includes at least one tab adjoined to said middle portion of said shank and adjoined to said first aperture to thereby adjoin said second handle to said head, said cup further has a second aperture, said middle portion of said shank extends through said second aperture, and said shank further has a distal end extending from said middle portion of said shank adjacent said second aperture, said second handle further includes, a rod having a proximal end and a distal end, said proximal end of said rod adjoined to a distal end of said shank, and a barb adjoined to said distal end of said rod, wherein said second handle further includes at least one knob adjoined to said rod.

* * * * *